(12) United States Patent
Sacher et al.

(10) Patent No.: US 8,136,050 B2
(45) Date of Patent: Mar. 13, 2012

(54) ELECTRONIC DEVICE AND USER INTERFACE AND INPUT METHOD THEREFOR

(75) Inventors: Heiko K. Sacher, Menlo Park, CA (US); Maria E. Romera, San Jose, CA (US); Jens Nagel, San Francisco, CA (US)

(73) Assignee: Nuance Communications, Inc., Burlington, MA (US)

( * ) Notice: Subject to any disclaimer, the term of this patent is extended or adjusted under 35 U.S.C. 154(b) by 406 days.

(21) Appl. No.: 10/719,576

(22) Filed: Nov. 21, 2003

(65) Prior Publication Data

US 2005/0114770 A1    May 26, 2005

(51) Int. Cl.
*G06F 3/048* (2006.01)
(52) U.S. Cl. ......... 715/816; 715/814; 715/815; 715/854
(58) Field of Classification Search .................. 715/854, 715/814–818, 864; 345/184
See application file for complete search history.

(56) References Cited

U.S. PATENT DOCUMENTS

| | | | |
|---|---|---|---|
| 5,845,300 A * | 12/1998 | Comer et al. ................. | 715/203 |
| 5,952,942 A | 9/1999 | Balakrishnan | |
| 6,208,339 B1 * | 3/2001 | Atlas et al. .................... | 715/780 |
| 6,307,549 B1 * | 10/2001 | King et al. .................... | 715/810 |
| 6,310,634 B1 * | 10/2001 | Bodnar et al. ................ | 715/854 |
| 6,392,640 B1 * | 5/2002 | Will .............................. | 345/184 |
| 7,155,683 B1 * | 12/2006 | Williams ....................... | 715/816 |
| 7,188,304 B2 * | 3/2007 | Morimoto et al. ............ | 715/259 |
| 7,188,316 B2 * | 3/2007 | Gusmorino et al. .......... | 715/764 |
| 7,392,326 B2 * | 6/2008 | Vale .............................. | 709/245 |
| 2002/0107896 A1 * | 8/2002 | Ronai ........................... | 707/530 |
| 2004/0153963 A1 * | 8/2004 | Simpson et al. ........... | 715/500.1 |

\* cited by examiner

*Primary Examiner* — Simon Ke
(74) *Attorney, Agent, or Firm* — Michael A. Glenn; Glenn Patent Group

(57) ABSTRACT

A portable electronic device (100,400) and user interface (425) are operated using a method including initiating entry of a content string; determining the most probable completion alternative or a content prediction using a personalized and learning database (430); displaying the most probable completion alternative or next content prediction; determining whether a user has accepted the most probable completion alternative or next content prediction; and adding the most probable completion alternative or next content prediction to the content string upon user acceptance.

18 Claims, 13 Drawing Sheets

| KEY | NAVIGATION MODE | EDITING MODE | HOLD AND PRESS |
|---|---|---|---|
| 1-9 | ENTER EDIT MODE | DISPALY THE MOST PROBABLE OF THE ASSIGNED CHARACTERS MULTI-TAP RETURNS CHARACTERS | DISPLAYS NUMBER ASSIGNED TO KEY AS DEFAULT, OTHER ALTERNATES AVAILABLE TEMPORARY NUMBERIC MODE UNTIL A SPACE OR ALPHA CHARACTER IS CHOSEN |
| SHIFT KEY (195) | SHIFT CASE TO UPPER, CAPS LOCK, AND BACK TO LOWERCASE | SHIFT CASE TO UPPER, CAPS LOCK, AND BACK TO LOWERCASE | DISPLAY 0 |
| SPACE KEY (190) | ENTER SPACE | CONFIRM WORD AND ENTER SPACE | CARRIAGE RETURN |
| MODE KEY (175) | CHANGE METHOD (PREDICTIVE, MULTITAP NUMERIC, SYMBOLS) | CHANGE METHOD (TEXT, NUMERIC, SYMBOLS) | RETURN TO DEFAULT METHOD |
| RIGHT CONTROL (160) | SCROLLS CURSOR RIGHT ONE CHARACTER AT A TIME | ACCEPTS WORD COMPLETION, OR ACCEPTS NEXT WORD PREDITCTION | IN NAVIGATION MODE, JUMPS CURSOR RIGHT ONE WORD AT A TIME |
| LEFT CONTROL (170) | SCROLLS CURSOR LEFT ONE CHARACTER AT A TIME | REMOVES LAST VIRTUAL KEY PRESS | IN NAVIGATION MODE, JUMPS CURSOR LEFT ONE WORD AT A TIME IN EDITING MODE, DISMISSES PREDICTION AND LOCKS THE LAST KEY PRESS ENTRY |
| DOWN CONTROL (165) | SCROLLS CURSOR DOWN ON LINE AT A TIME | SCROLLS TO NEXT KEY PRESS ALTERNATE (APPEARING AT CURSOR) | IN NAVIGATION MODE, ACTS AS PAGE DOWN IN EDITING MODE, OPENS DEDICATED ALTERNATES VIEW |
| UP CONTROL (155) | SCROLLS CURSOR UP ONE LINE AT A TIME | SCROLLS TO PREVIOUS KEY PRESS ALTERNATE (APPERAING AT CURSOR) | IN NAVIGATION MODE, ACTS AS PAGE UP IN EDITING MODE, OPENS DEDICATED ALTERNATES VIEW |
| MENU KEY (180) | OPENS CONTEXT DEPENDENT MENU | OPENS CONTEXT DEPENENT MENU, WITH "VIEW ALTERNATES" LISTED FIRST | (NO FUNCTION) |
| FIRST SOFT KEY (135) | APPLICATION SPECIFIC FUNCTION SUCH AS "OK", "SAVE", ETC. | LOCKS THE CURRENT DISAMBIGUATION STRING, DELETES ALL COMPLETIONS AND PREDICTIONS | (NO FUNCTION) |
| SECOND SOFT KEY (140) | DELETES THE CHARACTER TO THE LEFT OF THE CURSOR | DELETES THE LAST CHARACTER ENTERED AND DISMISSES THE COMPLETION/PREDICTION | DELETES THE ENTIRE TEXT BUFFER ONE WORD AT A TIME |

*FIG. 2*

| KEY | NAVIGATION MODE | EDITING MODE | HOLD AND PRESS |
|---|---|---|---|
| 1-9 | ENTER EDIT MODE | DISPLAYS THE MOST PROBABLE OF THE FOLLOWING, MULTI-TAP RETURNS CHARACTES | DISPLAYS NUMBER ASSIGNED TO KEY AS DEFAULT, OTHER ALTERNATES AVAILABLE TEMPORARY NUMBERIC MODE UNTIL A SPACE OR ALPHA CHARACTER IS CHOSEN |
| SHIFT KEY (195) | SHIFT CASE TO UPPER, CAPS LOCK, AND BACK TO LOWERCASE | SHIFT CASE TO UPPER, CAPS LOCK, AND BACK TO LOWERCASE | DISPLAY 0 |
| SPACE KEY (190) | ENTER SPACE | CONFIRM WORD AND ENTER SPACE | CARRIAGE RETURN |
| MODE KEY (175) | CHANGE METHOD (TEXT, NUMERIC SYMBOLS) | CHANGE METHOD (TEXT, NUMERIC, SYMBOLS) | RETURN TO DEFAULT METHOD |
| RIGHT CONTROL (160) | SCROLLS CURSOR RIGHT ONE CHARACTER AT A TIME | SCROLLS FORWARD TO WORD COMPLETION, THEN NEXT PREDITCTED WORD, AND HIGHLIGHTS IT FOR EDITING AND/OR APPROVAL. | IN NAVIGATION MODE, JUMPS CURSOR RIGHT ONE WORD AT A TIME, IN EDITING MODE, ACCEPTS ENTIRE PREDICTION WITHOUT A SPACE |
| LEFT CONTROL (170) | SCROLLS CURSOR LEFT ONE CHARACTER AT A TIME | SCROLLS BACK OUT OF PREDICTION | IN NAVIGATION MODE, JUMPS CURSOR LEFT ONE WORD AT A TIME. IN EDITING MODE, DISMISSES PREDICTION AND LOCKS THE LAST KEY PRESS ENTRY |
| DOWN CONTROL (165) | SCROLLS CURSOR DOWN ONE LINE AT A TIME | SCROLLS TO NEXT KEY PRESS ALTERNATE (APPEARING AT CURSOR) | IN NAVIGATION MODE, ACTS AS PAGE DOWN, IN EDITING MODE, OPENS DEDICATED ALTERNATES VIEW |
| UP CONTROL (155) | SCROLLS CURSOR UP ONE LINE AT A TIME | SCROLLS TO PREVIOUS KEY PRESS ALTERNATE (APPEARING AT CURSOR) | IN NAVIGATION MODE, ACTS AS PAGE UP. IN EDITING MODE, OPENS DEDICATED ALTERNATES VIEW |
| MENU KEY | OPENS CONTEXT DEPENDENT MENU | OPENS CONTEXT DEPENDENT MENU, WITH VIEW ALTERNATES LISTED FIRST | (NO FUNCTION) |
| FIRST SOFT KEY (135) | PERFORMS ACTION AS LABELED, TYPICALLY FORWARD | ACCEPTS THE ENTIRE COMPLETION/PREDICTION WITHOUT A SPACE | (NO FUNCTION) |
| SECOND SOFT KEY (140) | PERFORMS ACTION AS LABELED, TYPICALLY BACK | DELETES THE LAST CHARACTER ENTERED AND DISMISSES THE COMPLETION/PREDICTION | (NO FUNCTION) |

*FIG. 3*

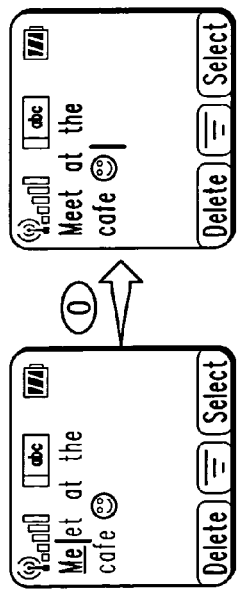
FIG. 18
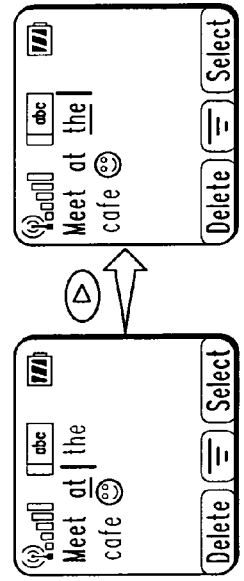
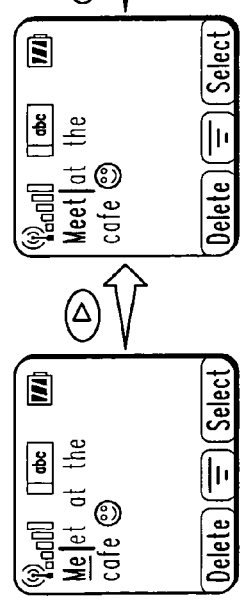
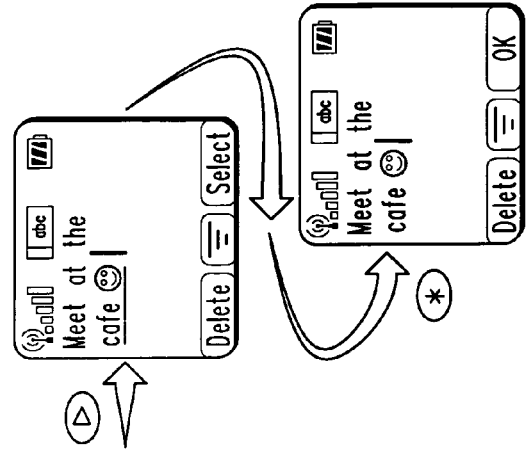
FIG. 19

ELECTRONIC DEVICE AND USER INTERFACE AND INPUT METHOD THEREFOR

BACKGROUND OF THE INVENTION

1. Field of the Invention

The present invention is related to electronic devices and a user interface and input method, and more particularly to a user interface and method for predictive content entry within an electronic device that features a hardware keypad, handwriting input with a pen, or onscreen keyboard.

2. Description of the Related Art

Content entry in handheld electronic devices (such as cellular telephones phones, personal digital assistants (PDAs), wireless messaging devices, web pads, television set top boxes, and desktop personal computers, and the like) for such tasks as message creation, telephone book entry creation typically uses either a full QWERTY keyboard or a numeric telephone keypad to input text. Many devices having numeric telephone keypads use multi-tap entry methods, in which multiple letters are assigned to a single key, and that key is pressed multiple times to select the desired letter, number, or other desired content. This can be time consuming and tedious. As the complexity of the functionality and utility of portable electronic devices increases, users of such devices desire simpler methods of content entry such as are available in intelligent keypad text entry systems. Some intelligent keypad text entry methods provide a method for a user to press only one key per letter. Input speed, accuracy, and overall usability can be increased as the system predicts the most likely word associated with a particular sequence of key presses.

Intelligent keypad text entry systems can enable users to easily create text messages on a handheld electronic device such as a cellular telephone, wireless messaging device, and the like. Such systems enable users to participate in instant messaging dialogues, and perform wireless transactions with ease. Such systems are further well suited for use with devices that have limited keypads like a standard television remote control, enabling text input to a television set top box for web surfing and e-commerce applications.

Intelligent text entry systems available for telephone keypads today provide word prediction by disambiguating numeric key sequences into most likely character combinations including the display of alternative word choices for a given key press or presses. Predictive text input for electronic devices such as handheld devices with numeric keypads has evolved to support the prediction of complete words, word combinations and phrases. This gives the user the possibility of entering complete words and phrases faster and more convenient. On the other hand, the potential of such a system to create wrong predictions that lead to whole sentences that are not desired by users is an issue that needs to be resolved at the user interface level. It is desirable for the user to have full control and feedback of the prediction process in an intuitive, fast fashion that requires minimal effort.

BRIEF DESCRIPTION OF THE DRAWINGS

The accompanying figures, where like reference numerals refer to identical or functionally similar elements throughout the separate views and which together with the detailed description below, are incorporated in and form part of the specification, serve to further illustrate various embodiments and to explain various principles and advantages all in accordance with the present invention.

FIGS. 2 and 3 are tables illustrating various examples of the utilization of a keypad within the electronic device of FIG. 1.

FIGS. 18 through 21 are examples of the various views that a user might see on a display of the electronic devices of FIGS. 1 and 3 in accordance with the operation of FIG. 17.

DETAILED DESCRIPTION

Figure 1:
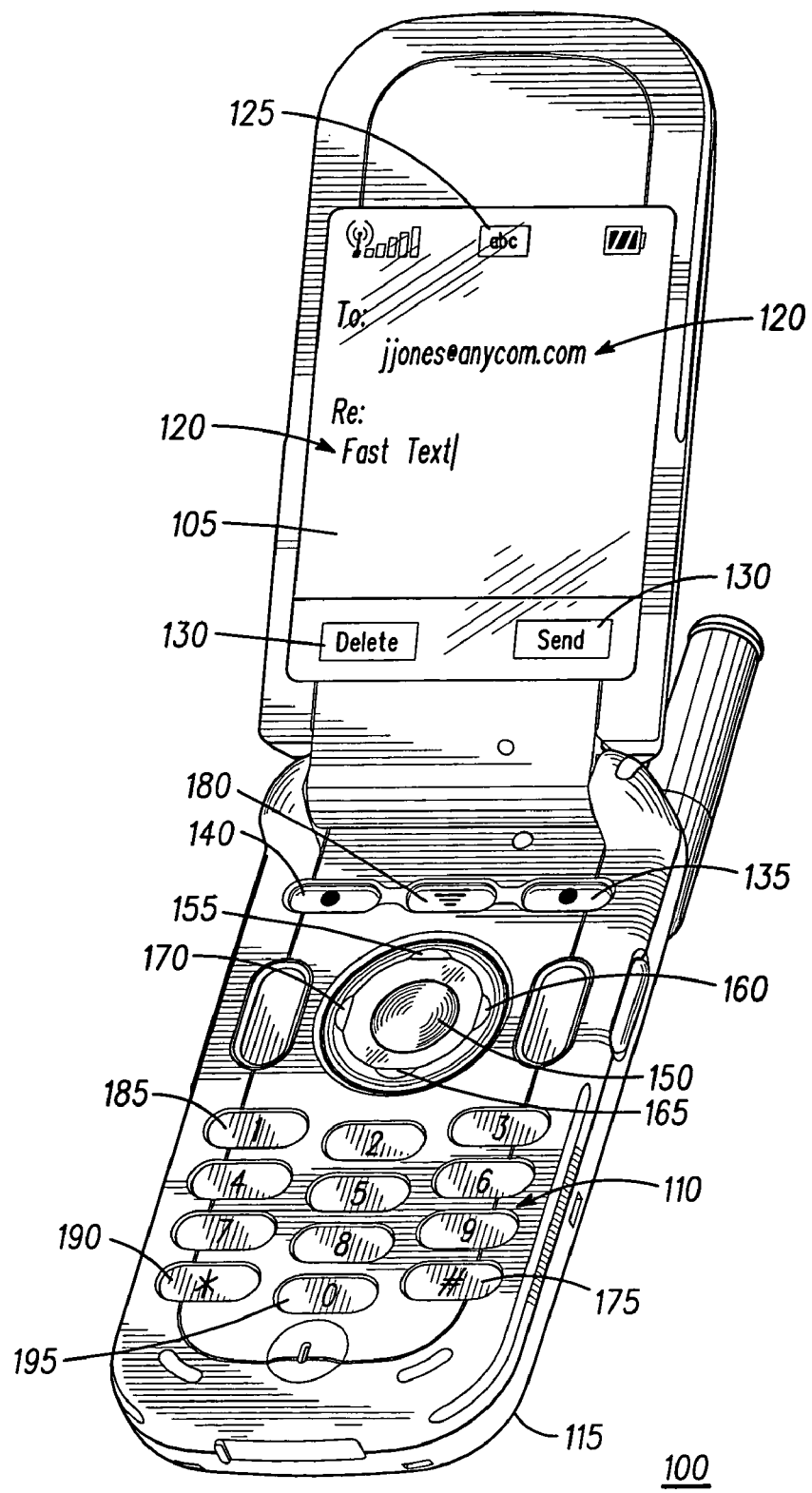
FIG. 1 illustrates an electronic device including a user interface.

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The terms program, software application, and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system.

A method and apparatus for a human user to interactively enter content such as an alphanumeric text message or a phonebook entry into a portable electronic device using a keypad containing a plurality of controls is disclosed. Content which can be entered within the scope of the invention can incorporate any of the letters of the alphabet, phrases, words, numbers, symbols, pictograms, icons, sounds, and the like, and is not limited to the English language or other Western languages, but can also include languages such as Japanese, Chinese or the Cyrillic alphabet. The present invention provides a user interface for controlling the content and depth of next content prediction. The present invention can be utilized with multiple languages including the mixing of multiple languages and multiple types of content.

User studies have shown that users need rigid, but also flexible control of the prediction process for content origination. Depending on the context and level of experience with the system, a user might enter content conservatively (i.e. use only word completion or some next word prediction), or the user may use prediction of longer phrases without spending much time on individual characters. By controlling the depth of prediction, users can intuitively control the level of prediction that they feel most comfortable with. In addition, the control of the present invention provides a very intuitive way of "backing out" of prediction should the predicted path not match with user's expectations. A second control scrolls through prediction alternates and adds control over the content to the functionality.

Referring to FIG. 1, an exemplary electronic device 100 including a user interface for content input is shown. It will be appreciated by those of ordinary skill in the art that the electronic device 100 can be a cellular telephone (as illustrated), a cordless telephone, a mobile telephone, a wired landline telephone, or a personal communicator. Similarly, the electronic device 100 can be a personal digital assistant, a personal computer, an electronic gaming device, and the like. Although the present invention will be described below in a form that is adapted for use in a cellular telephone, it is to be understood that it can also be utilized in any other type of electronic device that incorporates a display and a user input, and as such, is not intended to be limited to telephonic applications. For example, the present invention can also be incorporated in settings so diverse as automobile radios and compact disc players that have user inputs and displays. Given the unending proliferation of electronic devices that incorporate user inputs and displays, the number of devices that would benefit from the present invention is innumerable. In the following description, the term "electronic device" refers to any of the electronic devices mentioned above or an equivalent. As illustrated, the electronic device 100 includes a display 105 and a keypad 110 contained within a device housing 115.

The display 105 provides visual information by displaying data such as one or more communication messages, phone numbers, caller identifications, graphic images, text entries, and the like. It will be appreciated by those of ordinary skill in the art that the display 105 can be a liquid crystal display, a cathode ray tube display, one or more organic light emitting diodes, one or more LEDs, a plasma display, or an equivalent. The display 105 includes, as illustrated, a content viewing area 120, a mode indicator 125 and one or more soft key labels 130.

The keypad 110 allows the user of the electronic device 100 to enter content strings such as phone numbers, names, and text memos, and otherwise interact with the electronic device 100 using a plurality of controls. The keypad 110, for example, contains a plurality of individual keys arranged in a 3-4 matrix, typically twelve keys, one each assigned to the numbers 0-9 and the symbols "*" and "#". It will be appreciated by those of ordinary skill in the art that depending on the configuration of the particular electronic device, there may be additional keys devoted to other functions. The keypad 110, as illustrated, includes a first soft key 135, a second soft key 140, a navigation key 150 having an up control 155, a right control 160, a down control 165, and a left control 170, a mode switching key 175, a menu key 180, a punctuation key 185, a space key 190, and a shift key 195. It will be appreciated by those of ordinary skill in the art that the keypad arrangement illustrated in FIG. 1 is an exemplary arrangement and that other, equivalent, keypad arrangements can be utilized within the scope of the present invention.

The electronic device 100 operates using a user interface including one or more operation modes. The operation modes, for example, can include a navigation mode, an editing mode, and a hold and press mode. FIGS. 2 and 3 are exemplary tables illustrating alternate embodiments of the utilization of the keypad 110 in accordance with the present invention dependent upon the particular mode chosen by the user.

As illustrated in FIGS. 2 and 3, the user can change the operation mode by pressing the mode switching key 175 or via the menu key 180. From any operation mode, the user can hold-and-press the mode switching key 175 to return to the default entry method. Preferably, each mode has its own icon, displayed on the display 105 as the mode indicator 125 to facilitate an indication to the user of the current status.

Figure 4:
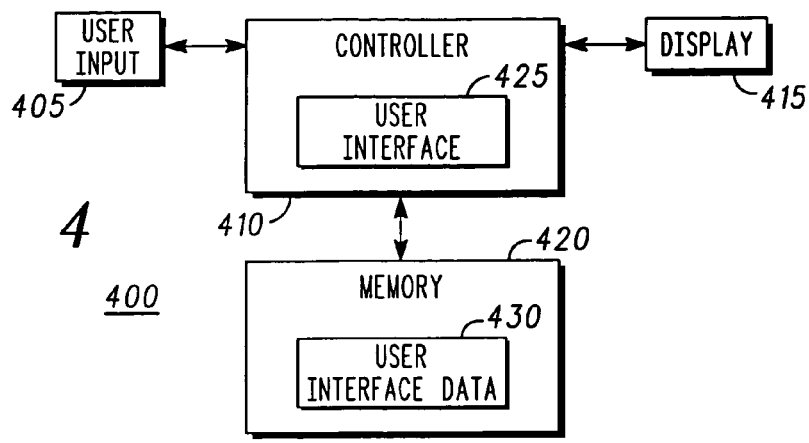
FIG. 4 is an electronic block diagram detailing internal circuitry of the portable electronic device of FIG. 1.

FIG. 4 is an electronic block diagram detailing internal circuitry of an electronic device 400 such as the electronic device 100 of FIG. 1. The electronic device 400, as illustrated, comprises a user input 405, a controller 410, a display 415, and a memory 420.

The user input 405 can include a keypad (for example the keypad 110 of FIG. 1) such as one or more buttons used to generate a button press or a series of button presses. The user input 305 can also include a voice response system or other similar method of receiving a manual input initiated by the device user. The user input 405 can also include features a handwriting input with a pen, or an onscreen keyboard in accordance with the present invention.

Preferably, the user input 405 is coupled to the controller 410 using standard input and output drivers as are known in the art. The controller 410, in response to receiving a signal via the user input 405 performs commands as required. The controller 410 also sends commands to the user input 405 in response to various events and the like. For example, the user input 405 can be utilized for performing functions related to personalized, context-sensitive predictive content completion as described herein. The controller 410 utilizing conventional signal-processing techniques for processing received messages and performing operational actions as required by the electronic device 400. It will be appreciated by one of ordinary skill in the art that additional controllers can be utilized as required to handle the processing requirements of the controller 410.

In accordance with the present invention, the controller 410 includes a user interface 425 for providing operational functionality for the electronic device 400 in conjunction with the user input 405. For example, the user interface 425 can provide personalized, context-sensitive predictive content completion for the electronic device 400. It will be appreciated by those of ordinary skill in the art that the user interface 425 can be hard coded or programmed into the electronic device 400 during manufacturing, can be programmed over-the-air upon customer subscription, or can be a downloadable application. It will be appreciated that other programming methods can be utilized for programming the user interface 425 into the electronic device 400. It will be further appreciated by one of ordinary skill in the art that the user interface 425 can be hardware circuitry within the electronic device 400. In accordance with the present invention, the user interface 425 can be contained within the controller 410 as illustrated, or alternatively can be an individual user interface operatively coupled to the controller 410 (not shown).

The user interface 425 preferably provides the user with functionality to enter content within the electronic device 400 using the user input 405. For example, as the user presses the numeric keys on the keypad 110 (see FIG. 1), the possible letter combinations are displayed at the cursor in the content viewing area 120 (see FIG. 1). The most probable word can be shown, underlined in gray with an arrow suggesting the availability of alternate words, if any. These alternate words can be based, for example, on key presses as is well known in the art. The user can scroll through the alternate words by pressing the down control 165 of the navigation key 150, which will display the next selection, and/or the up control 155 to display previous selections. The user may select the word by pressing the space key 190. This will confirm the word and add a space after it. In accordance with the present invention, the user interface 425 uses one or more user interface data 430 stored in the memory 420 to provide alternates in order of probability and context. New words are saved to a user dictionary also preferably stored in the memory 420 for future retrieval upon confirmation with the space key 190. It will be appreciated by those of ordinary skill in the art that other user input techniques can be used, in accordance with the present invention, to enter text into the electronic device 400.

To perform the necessary functions of the electronic device 400, the controller 410 is coupled to the display 415. As required, the controller 410 preferably generates a command signal to the display 415 to generate a visual notification. Similarly, the display 415 can be utilized as a means for providing information to the device user. For example, various user interface notifications can be displayed on the display such as the mode indicator 125 of FIG. 1. Further, one or more content can be displayed in on the display 415 in a given location such as the content viewing area 120 of FIG. 1.

To perform the necessary functions of the electronic device 400, the controller 410 is operatively coupled to the memory 420, which can include a random access memory (RAM), a read-only memory (ROM), an electrically erasable programmable read-only memory (EEPROM), and flash memory. The memory 420, for example, includes memory locations for the storage of one or more received or transmitted messages, one or more software applications, one or more image data, one or more user interface data 430, and the like.

It will be appreciated by those of ordinary skill in the art that the memory 420 can be integrated within the electronic device 400, or alternatively, can be at least partially contained within an external memory such as a memory storage device. The memory storage device, for example, can be a subscriber identification module (SIM) card. A SIM card is an electronic device typically including a microprocessor unit and a memory suitable for encapsulating within a small flexible plastic card. The SIM card additionally includes some form of interface for communicating with the electronic device 300. The SIM card can be used to transfer a variety of information from/to the electronic device 400 and/or any other compatible device.

Figure 5:
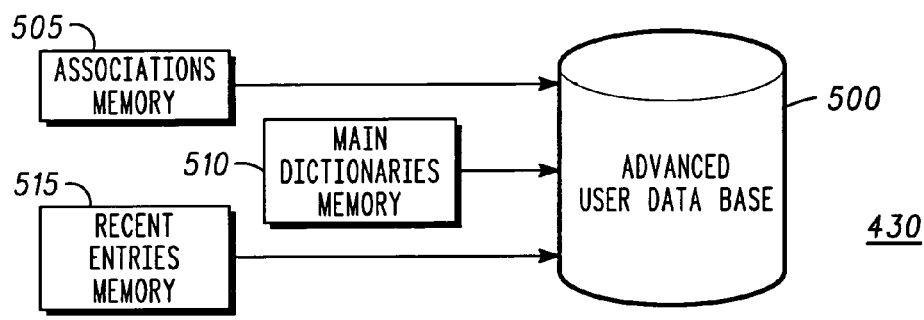
FIG. 5 is an electronic block diagram of a memory for use within the electronic devices of FIGS. 1 and 4.

FIG. 5 illustrates one portion of the memory 420 for use within the electronic devices of FIGS. 1 and 4. Specifically, FIG. 5 illustrates more detail of the user interface data 430 of the memory 420. As illustrated, the user interface data 430 preferably includes a user database 500 receiving inputs from an associations memory 505, a main dictionaries memory 510, and a recent entries memory 515. The user database 500 is a personalized and learning database which stores recently used data such as new words, word associations (phrases, idioms, names etc.), URLs (Uniform Resource Locators), electronic mail addresses, and any other content strings used by the user. Context and sensitivity associations of entered content are stored in the associations memory 505. The main dictionaries memory 510 can store one or more language dictionaries as chosen by the user. For example, the main dictionaries memory 510 can include a United States English dictionary, a United Kingdom English dictionary, a Dutch dictionary, and the like. The user database 500 uses the associations memory 505, the main dictionaries 510, and the recent entries memory 515 to re-sort content used by the user to customize re-ordering of content based on personalized usage. The sorted content stored in the user database 500 can be utilized, for example, by the user interface 425 in predicted next content and content completion operations within an electronic device.

Figure 6:
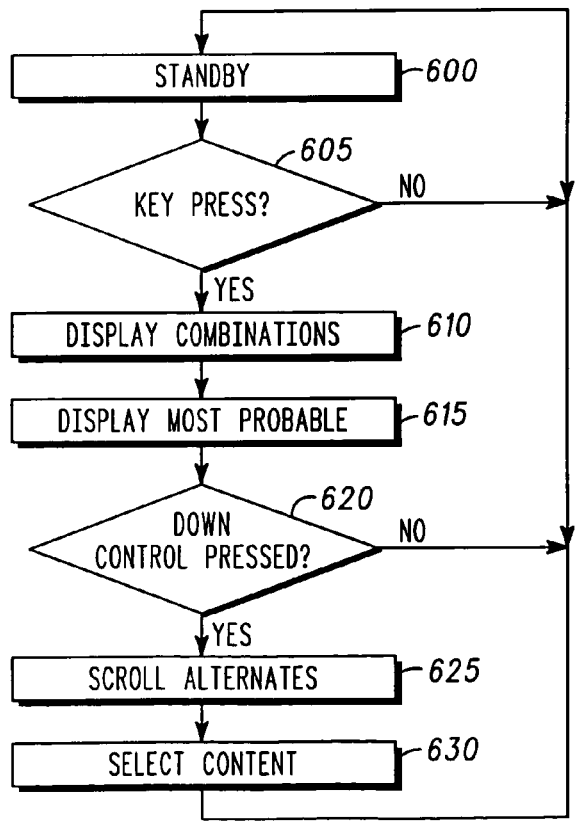
FIGS. 6 and 7 are flow diagrams illustrating various embodiments of the operation of the electronic device of FIGS. 1 and 4.

FIG. 6 is a flowchart illustrating one embodiment of the operation of a user interface within an electronic device. Specifically, FIG. 6 illustrates a typical operation for entering content using a keypad within a portable electronic device. As illustrated, the operation begins with Step 600 in which the electronic device is in a standby mode awaiting a user input. Next, in Step 605, the user interface determines whether or not the user has pressed a key. When the user has not pressed a key, the operation cycles back to standby mode of Step 600. When the user has pressed a key in Step 605, the process moves to Step 610 in which the possible content combinations are displayed. Next, in Step 615, the most probable next content is shown. For example, the most probable content can be shown underlined in gray with an arrow suggesting the availability of alternates, if any. These alternate contents are based on the key presses. Next, in Step 620, the user interface determines whether a down control has been selected by the user (for example, pressing the down control 165). When the down control has been selected, the operation moves to Step 625 in which the user can scroll through the alternate content using the user input. For example, the user can scroll the alternate content choices for completing the content string by pressing the down control 165 of the navigation key 150, which will display the next selection, and/or the up control 155 to display previous selections. Next, in Step 630, the user can select the content. For example, the user can select the content by pressing the space key 190. This will confirm the content string.

The present invention provides a method for content string completion. Content string completion provides a user friendly method for completing a current input string in order to form a meaningful content entry such as a word, phrase, message, telephone number, name, and the like. The completion appears automatically on the display and is actively confirmed by the user in order to be committed to the content string. The user does not need to actively dismiss content completions. They are either changed or deleted as the user is typing. Alternates for content completions are displayed to the user in order of probability and context. New content entries are saved to the user dictionary for future retrieval.

Figure 7:
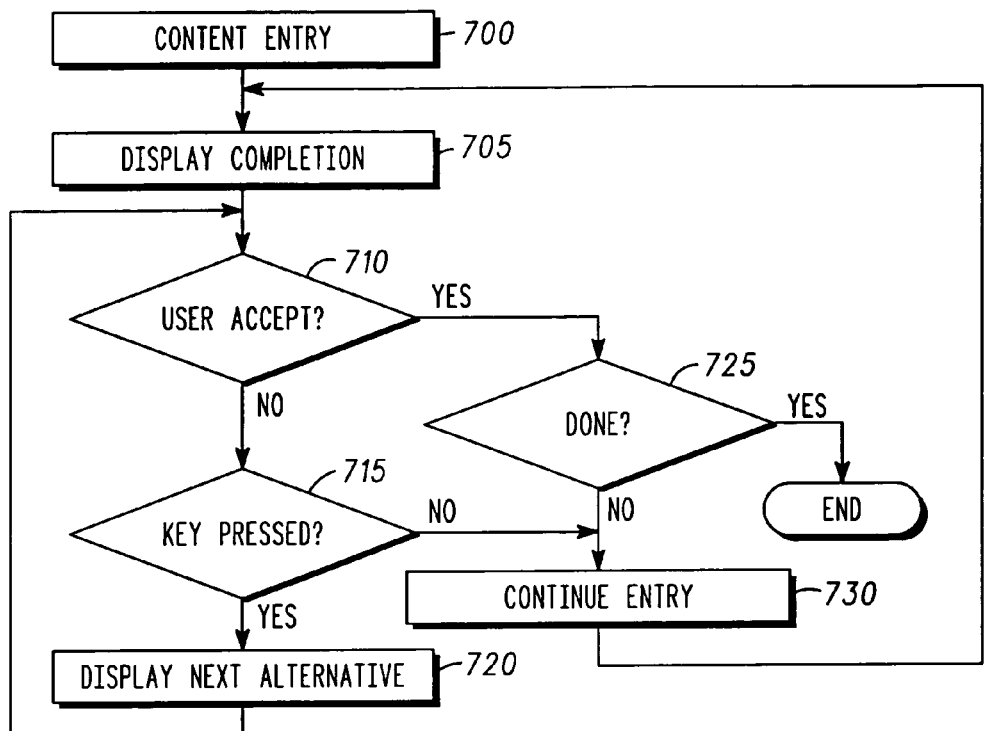
Figure 10:
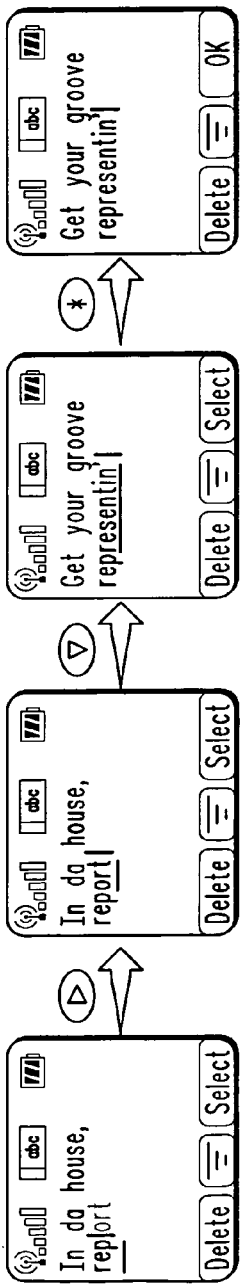

FIG. 7 is a flowchart illustrating one embodiment of the operation of content completion within a user interface of an electronic device (such as the user interface 425 of FIG. 4) in accordance with the present invention. The operation begins with Step 700 in which the user initiates entry of a content string. Next, in Step 705, a most probable completion alternative is offered to the user. For example, the most probable completion alternative can be displayed on the display (105, 415) in a shaded font. The completion is the most probable content from the user database 500 to complete the already typed content. Next, in Step 710, the operation determines whether the user accepts the completion. When the user does not accept the completion in Step 710, the process continues to Step 715 in which the user interface determines whether the user has pressed a key to update the completion alternates. (see, i.e., FIG. 10) When a key has been pressed in Step 715, the operation continues with Step 720 in which other alternatives are displayed. For example, the user interface can dismiss the first completion, and offer a new completion. The operation then cycles back to Step 710 to determine whether the user accepts the new alternative.

Figure 8:
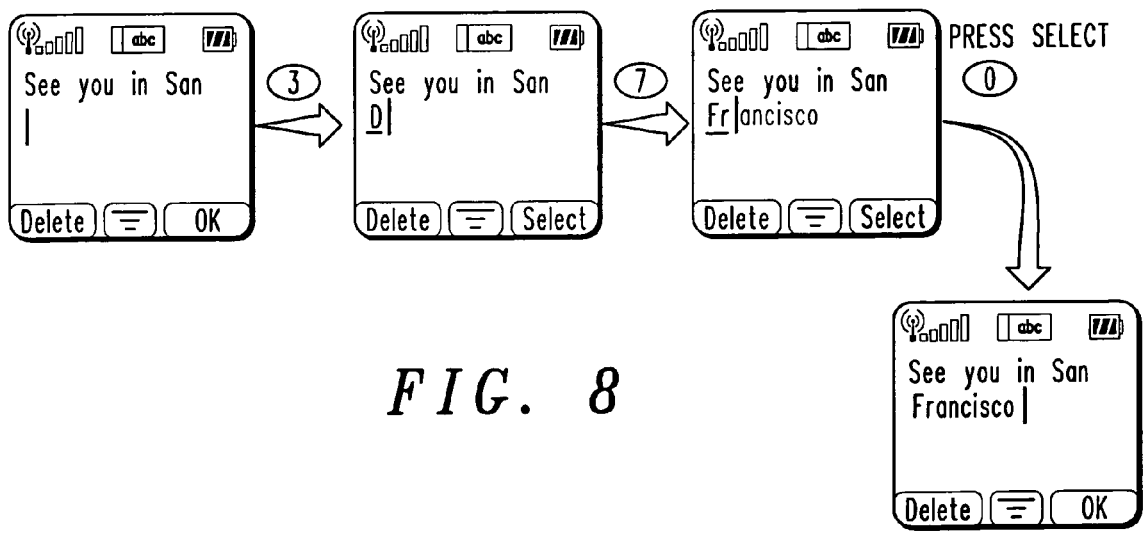
FIG. 8 through 11 are examples of the various views that a user might see on a display of the electronic devices of FIGS. 1 and 3 in accordance with the operation of FIG. 7.
Figure 9:
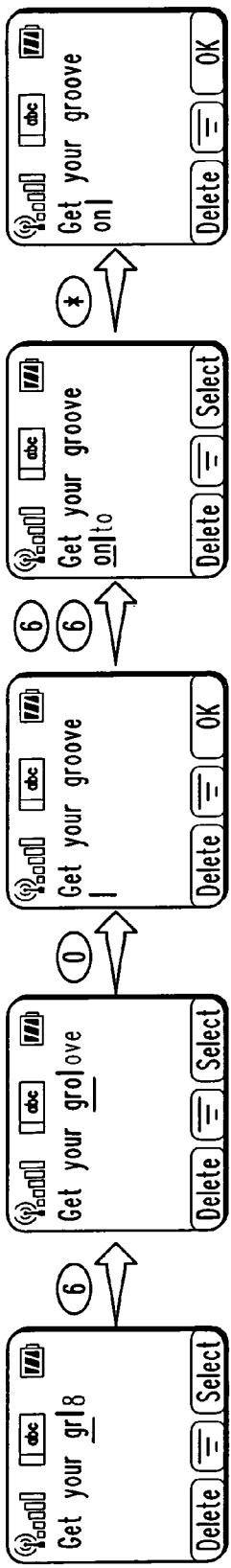

When the user accepts the alternative in Step 710 (see i.e. FIG. 8), the operation continues with Step 725 in which the user interface determines whether the content entry is completed. The user's acceptance, for example can comprise pressing the right control 160 of the navigation key 150. One or more display characteristics can be changed to indicate the acceptance. As an example, the markup of the current content is changed from blue/underlined to black/non-underlined in order to reflect the fact that content is now "accepted" and will not change anymore on subsequent key presses. In Step 725, when the content entry is completed, the operation ends. When the content entry is not completed in Step 725, and when no key has been pressed in Step 715, the operation continues with Step 730 in which content entry by the user continues. (For example, see FIG. 9) The operation then cycles back to Step 705 in which completions are displayed as the user enters the content string.

Figure 11:
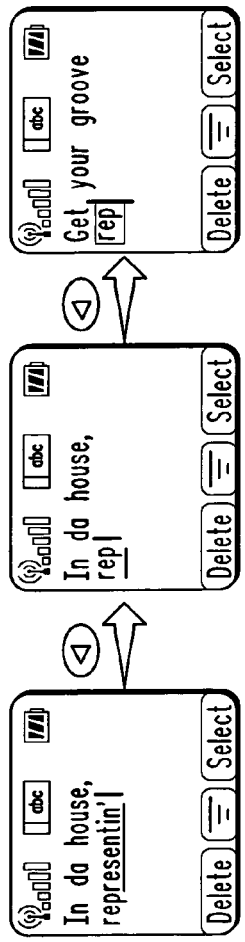

Although not illustrated in the flowchart of FIG. 7, in accordance with the present invention, after the user has used the right control to check completion alternates, they may return to the key press alternate by simply pressing the left control. (see FIG. 11) This will get rid of the completion altogether, in a sense, "going back" to where they were. Once the focus is returned to the level of the key press alternate, one further press of the left control will serve to lock the key press alternate.

Figure 12:
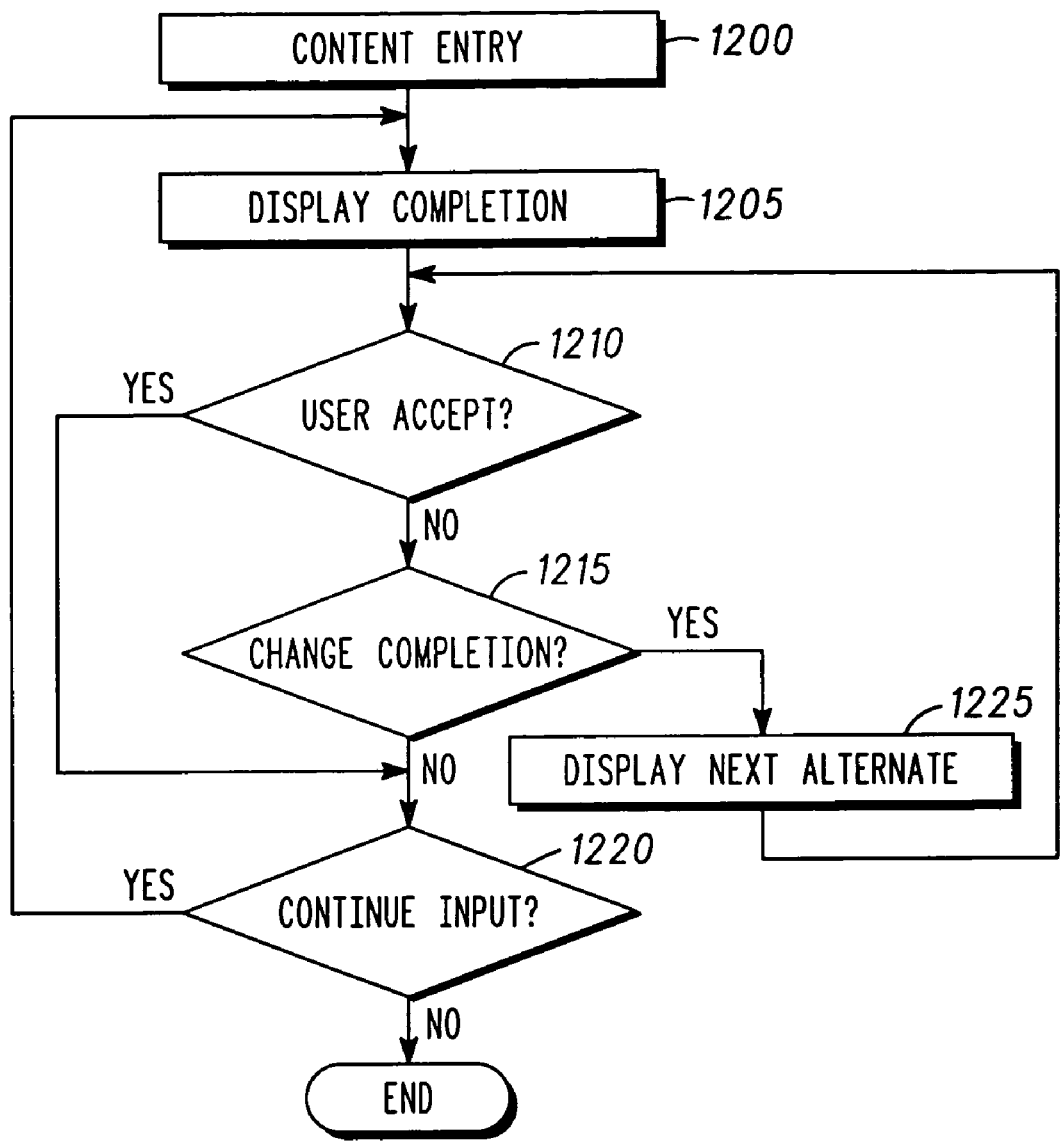
FIG. 12 is a flow diagram illustrating one embodiment of the operation of the electronic devices of FIGS. 1 and 3.

FIG. 12 is a flowchart illustrating an alternate embodiment of the operation of content completion within a user interface of an electronic device (such as the user interface 425 of FIG. 4) in accordance with the present invention. As discussed previously herein, the content completion feature allows the user to confirm their content string or one or more content elements within a content string without having to enter all the content elements. Preferably, one completion is offered at a time, and is shown as grayed out text inline with the word being created. The completion is the most probable word from the user database using context when available.

Figure 13:
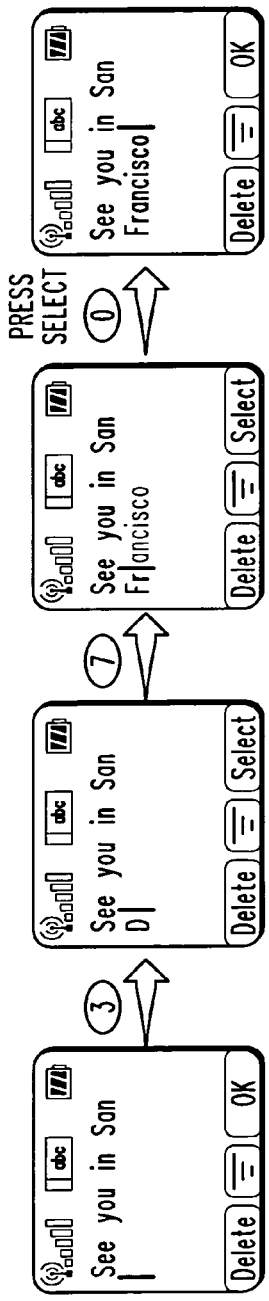
FIGS. 13 through 16 are examples of the various views that a user might see on a display of the electronic devices of FIGS. 1 and 3 in accordance with the operation of FIG. 12.

The operation begins with Step 1200 in which the user has entered a content string. Next, in Step 1205, a most probable completion alternative is offered to the user. For example, the most probable completion alternative can be displayed on the display (105,415) in a shaded font. The completion is the most probable content from the user database 500 to complete the already typed content. Next, in Step 1210, the operation determines whether the user accepts the completion. For example, if the completion offered is the word the user wants, they may confirm it into the text by pressing one of the soft keys. (see i.e. FIG. 13)

Figure 14:
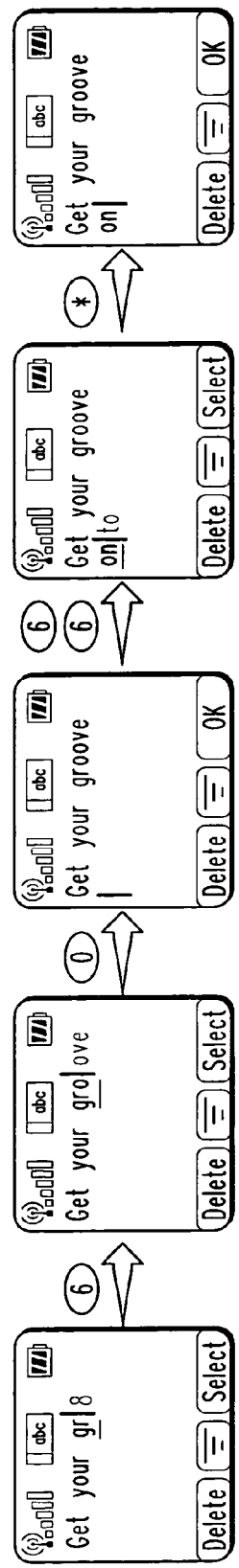
Figure 15:
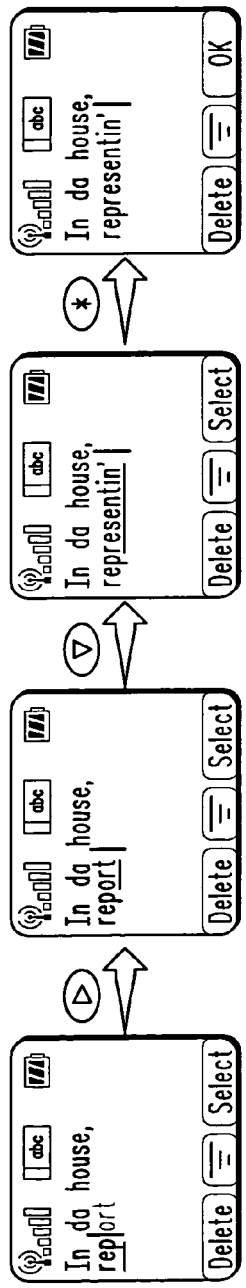

When the user does not accept the completion in Step 1210, the operation determines next in Step 1215 whether or not a user input has been received to change the completion. When the user desires to change the completion in Step 1215, the operation continues with Step 1225 in which alternatives are displayed. For example, the user can override the completion. If the completion offered is not the desired word, the user may simply keep typing. A press of any of the 1-9 keys will update the key press alternate, dismiss the first completion, and offer a new completion after a one second timeout. A press of the space key will confirm the letters that have been entered via key press into the text area, followed by a space. (see i.e. FIG. 14). Alternatively, the user can change the completion. If the completion offered is not the desired word, the user may also look to see if their word is in the list of completion alternates. This type of alternate is based on dictionary words that complete the key press alternate that is displayed at the cursor. To do this, the user presses one or more of the controls of the navigation key once. The gray underline indicating alternates moves to the completion letters, and the text changes color to black. The user may use the up and down control keys to scroll through completion alternates, the same as with key press alternates. (see i.e. FIG. 15) The operation then cycles back to Step 1210 in which the operation determines whether the user accepts the alternatives.

When the user does not desire to change the completion in Step 1215 and when the user accepts a completion in Step 1210, the operation continues with Step 1220 in which the user interface determines whether or not the user is to continue inputting a content entry. When the user desires to continue, the operation cycles back to Step 1205. When the user does not, the operation of content entry ends.

Figure 16:

In one embodiment (not shown) a user input can cause the backing up of the completion operation. For example, if the user has used the right control to check completion alternates, they may return to the key press alternate by simply pressing the left control key. This will get rid of the completion altogether, in a sense, "going back" to where they were. Once the focus is returned to the level of the key press alternate, one further press of the left arrow key can serve to lock the key press alternate. (see i.e. FIG. 16)

The present invention further provides a method for next content prediction. Similar to content completion, next content prediction provides the user with choices for next content suggestions are based upon words, phrases, and the like that the user commonly types as well as the context information that is collected within the user dictionary over time. For example, the next content prediction uses the user interface data 430 stored in the memory 420. Just like content completion, next content predictions are actively confirmed by the user in order to be committed into the text buffer. Alternates for next content predictions are displayed to the user in order of probability and context. New content entries are saved to the user dictionary for future retrieval.

Figure 17:
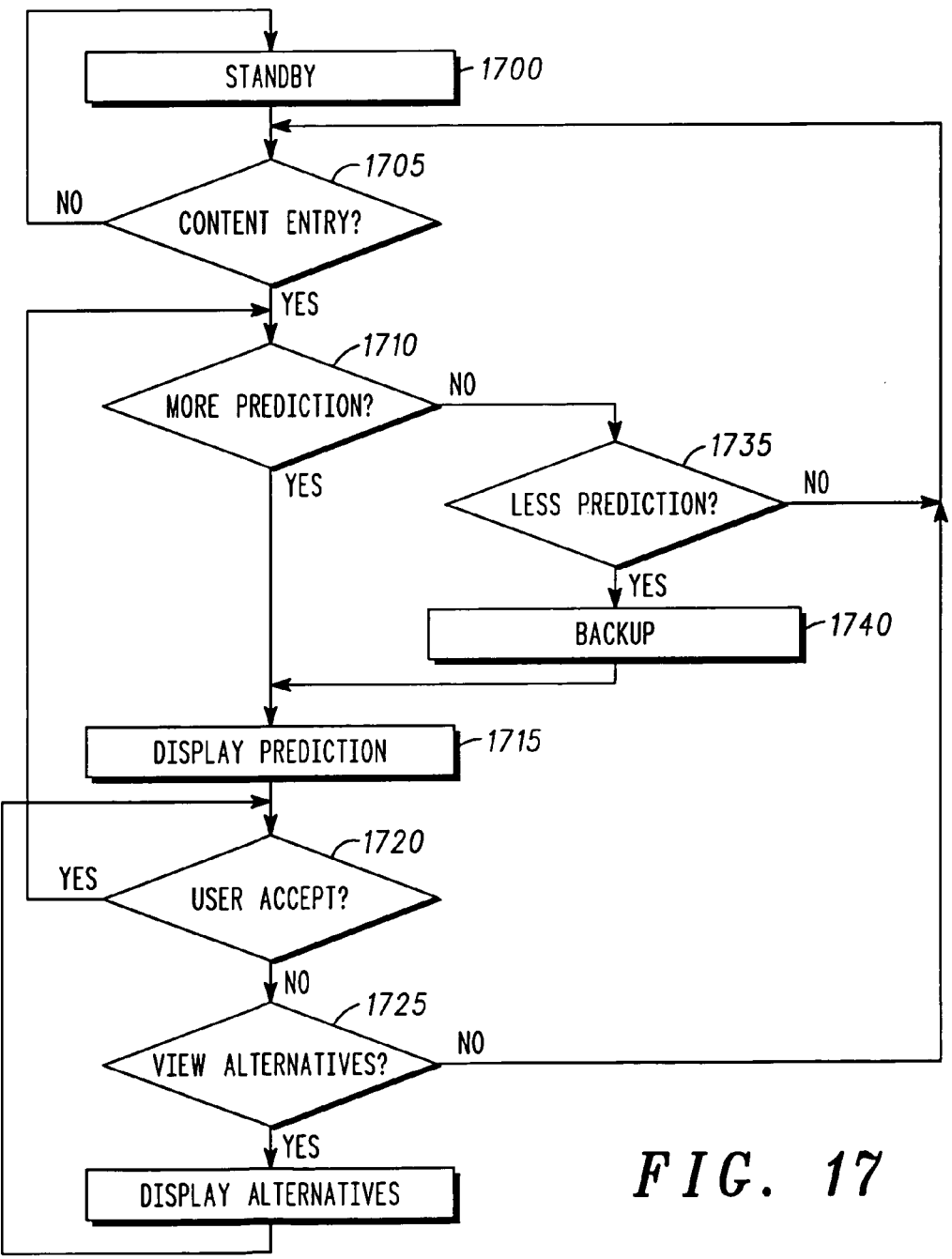
FIG. 17 is a flow diagram illustrating one embodiment of the operation of the electronic devices of FIGS. 1 and 3.

FIG. 17 is a flowchart illustrating one embodiment of the operation of the user interface 425 within an electronic device in accordance with the present invention. Specifically, FIG. 17 illustrates one embodiment of the operation of the user interface which learns the communication style of the user and makes predictions based on content such as words and phrases they have used in the past. As illustrated in FIG. 17, the operation begins with Step 1700 in which the electronic device is in standby mode. Next, in Step 1705 determines whether a new content entry is detected. For example, a user can input new content using the user input 405 (i.e. the keypad 110). When no content entry is detected in Step 1705, the operation returns to the standby mode of Step 1700.

When content entry is detected in Step 1705, the operation continues with Step 1710 in which the user interface 425 determines whether or not more prediction has been requested by the user. For example, the user interface 425 can be programmed such that the user pressing the right control 160 of the navigation key 150 indicates a request for moving forward with prediction of content. When more prediction is requested by the user in Step 1700, the operation continues with Step 1715 in which the most probable next content prediction is displayed. The user can then accept the displayed prediction, for example, by pressing a soft key as illustrated in FIG. 18. Alternatively, the user can press the right key to select the prediction and press the down key to browse to prediction alternatives. For example, the user interface 425 can use the user interface data 430 stored in the memory 420 to determine the next most probable content. The stored user interface data 430, for example can include context such as message recipient. It will be appreciated by those of ordinary skill in the art that the predicted content can include textual predictions, numeric predictions, symbolic predictions, iconic predictions, sounds and/or any combination thereof or an equivalent. The user interface 425 can predict any string saved to the user database 500.

Next, in Step 1720, the user interface 425 determines whether or not the user has accepted the predicted next content. For example, a press of the space key 190 or an equivalent can confirm the letters that have been entered via key press into the text area, followed by a space. It will be appreciated by those of ordinary skill in the art that the user can accept the entire prediction (See FIG. 18) or one or more portions of the prediction (see FIG. 19). For example, the user may accept predicted words encompassed within a phrase all at once or may accept one word at a time. Numbers formatted as phone numbers, dates, or times can be accepted and edited in chunks, just as sentences are edited by the word. Unformatted numbers are accepted as a whole chunk, or the user may simply override them. A "word" is considered to be any string the user enters followed by the space key.

Figures 20, 21:
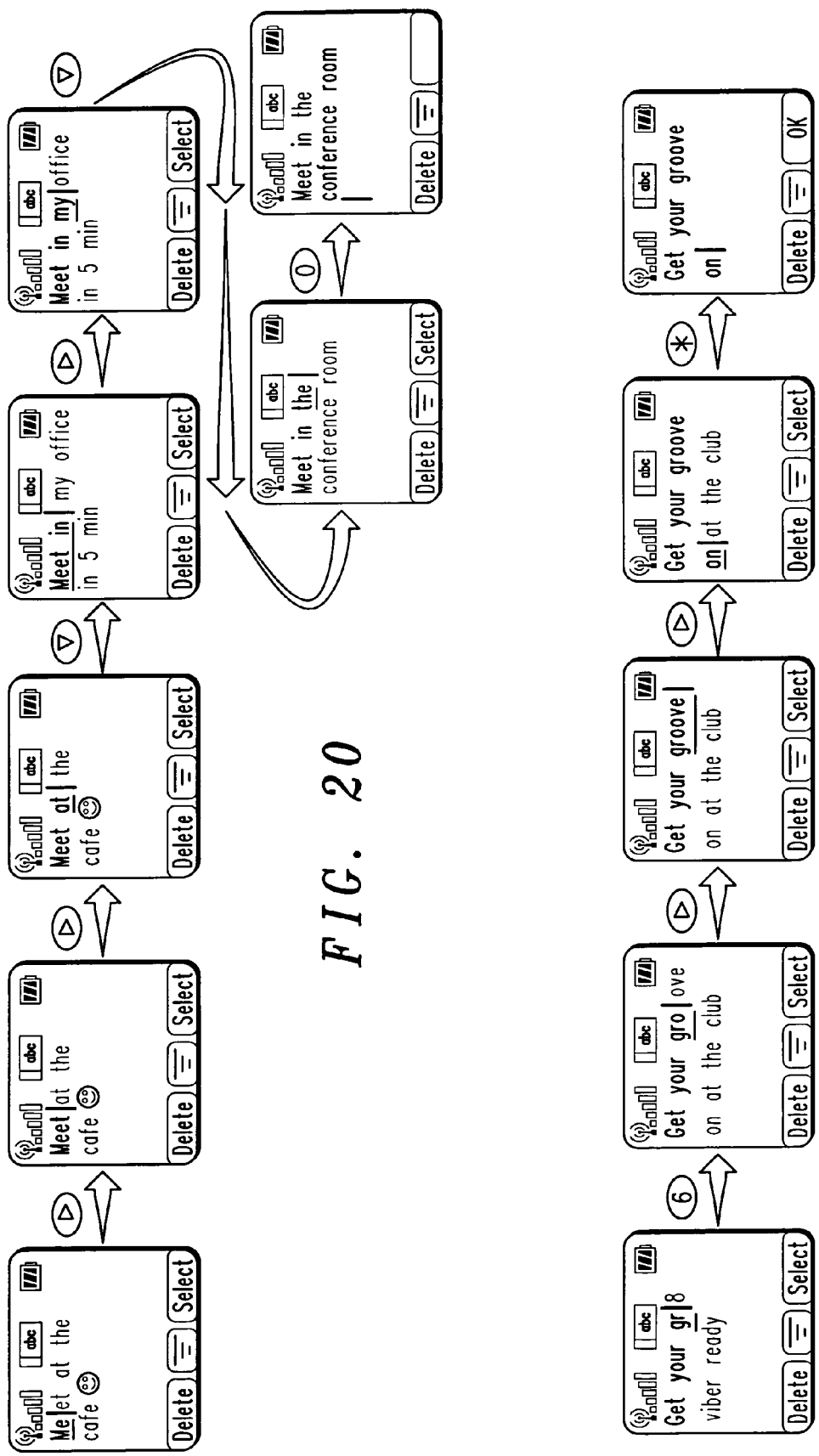

In one embodiment, when the prediction offered is not exactly the right word or phrase, the user may edit one word at a time. The user may press the right arrow to move the focus to the next word and look to see if their word is in the list of prediction alternates. This type of alternate is based on words associated with the key press alternate that is displayed at the cursor. The gray underline indicating alternates moves to the predicted letters, and the text changes color to black. (see FIG. 20)

When the user accepts the predicted content in Step 1720, the operation cycles back to Step 1710 wherein the user interface 425 determines whether more prediction is required by the user. When the user does not accept the predicted content in Step 1720, the operation continues to Step 1725 in which the user interface 425 determines whether alternative predicted content is available. The alternative predictive content, for example, can be stored in the memory 420 as part of the user interface data 430. When alternates exist in Step 1725, the alternates are displayed for the user. The user can view the various alternatives using the keypad 110. For example, the user can scroll through a list of alternate predicted content using the up control 155 and the down control 165 of the navigation key 150. When no alternates exists in Step 1725, the operation cycles back to Step 1705 and determines whether more content is being entered. For example, the user simply can keep entering text and ignore the suggested content. The user can, for example, press any of the 1-9 keys to update the key press alternate, dismiss the first prediction, and offer a new prediction after a one second timeout. (see FIG. 21)

Returning to Step 1710, when no more prediction is required by the user, the operation continues to Step 1735 in which the user interface 425 determines whether less prediction is desired. For example, the user can press the left control 170 of the navigation key 150 to request less prediction from the user interface 425. When no request for less prediction is detected in Step 1735, the operation returns to Step 1705 in which content entry can continue if required. When less prediction is requested in Step 1735, the operation continues with Step 1740 in which the predictive content backs up. For example, if the user has used the right arrow to accept or change predicted words, they may back up to an earlier point of this editing by simply pressing the left control 170. This enables the user to go back one word of the prediction at a time until they have reached the key press alternate, in a sense, "going back" to where they were. The operation then cycles back to Step 1715 and the new backed up predicted content is displayed.

Figure 22:
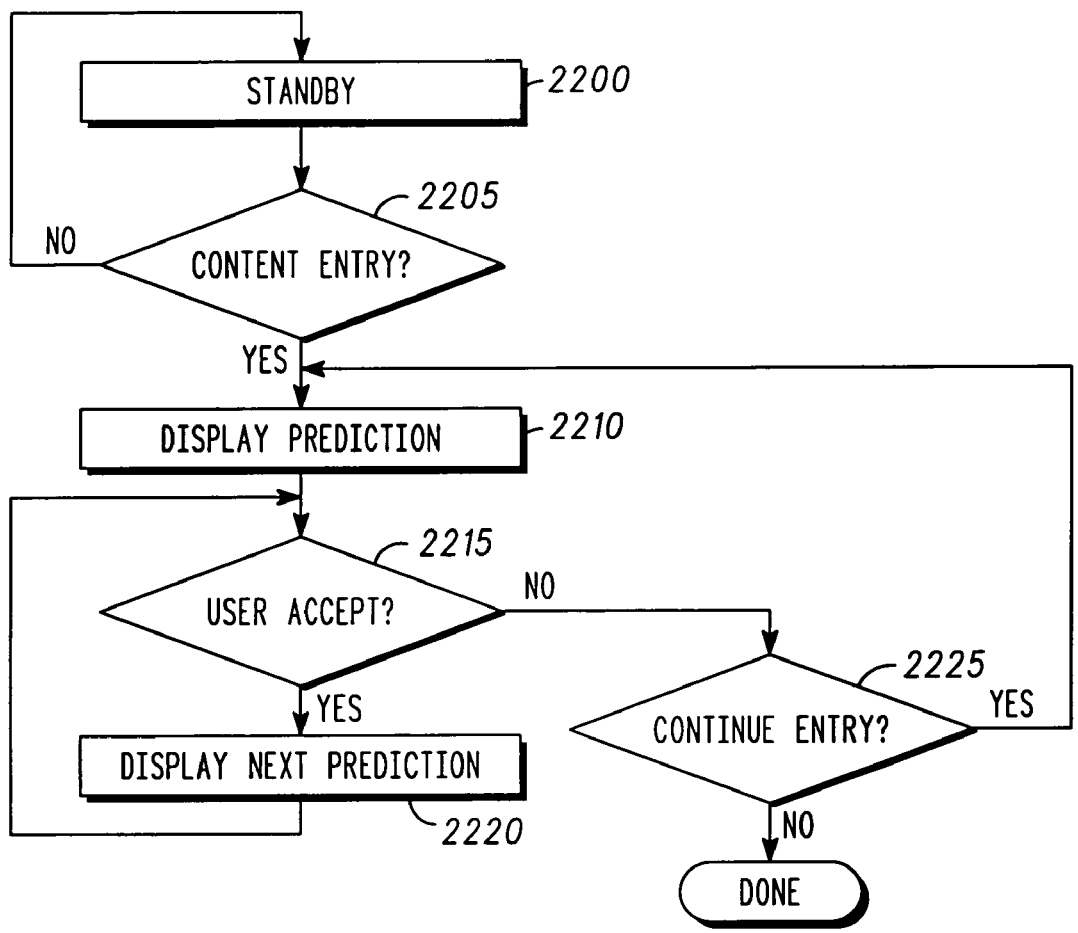
FIG. 22 is a flow diagram illustrating one embodiment of the operation of the electronic devices of FIGS. 1 and 3.

FIG. 22 is a flowchart illustrating one embodiment of the operation of the user interface 425 within an electronic device in accordance with the present invention. Specifically, FIG. 22 illustrates one embodiment of the operation of the user interface which learns the communication style of the user and makes predictions based on content such as words and phrases they have used in the past. Using the present invention, the user interface learns the communication style of the user and makes predictions based on content such as words and phrases they have used in the past by automatically storing them within the user dictionary. Upon entry later entry of the same or similar content, the user interface is able to retrieve those phrase constructs from the user dictionary and make meaningful suggestions for a likely next word.

As illustrated in FIG. 22, the operation begins with Step 2200 in which the electronic device is in standby mode. Next, in Step 2205 determines whether a new content entry is detected. For example, a user can input new content using the user input 405 (i.e. the keypad 110). When no content entry is detected in Step 2205, the operation returns to the standby mode of Step 2200.

When content entry is detected in Step 2205, the operation continues with Step 2210 in which a predicted content is displayed. Next in Step 2215, the user interface determines whether the user has accepted the predicted word. The user can accept the predicted content, for example by pressing the right control on the navigation button. (see i.e. FIG. 23). When the user has accepted the predicted content (i.e. a next-word prediction) in Step 2215, the operation continues to Step 220 in which the user interface causes the display of the next meaningful next-content element prediction. The operation then cycles back to Step 2215 to determine if the new next content prediction is accepted by the user. By using this technique the user can enter entire phrases within a minimum amount of time by accepting one prediction at a time.

Figure 23:
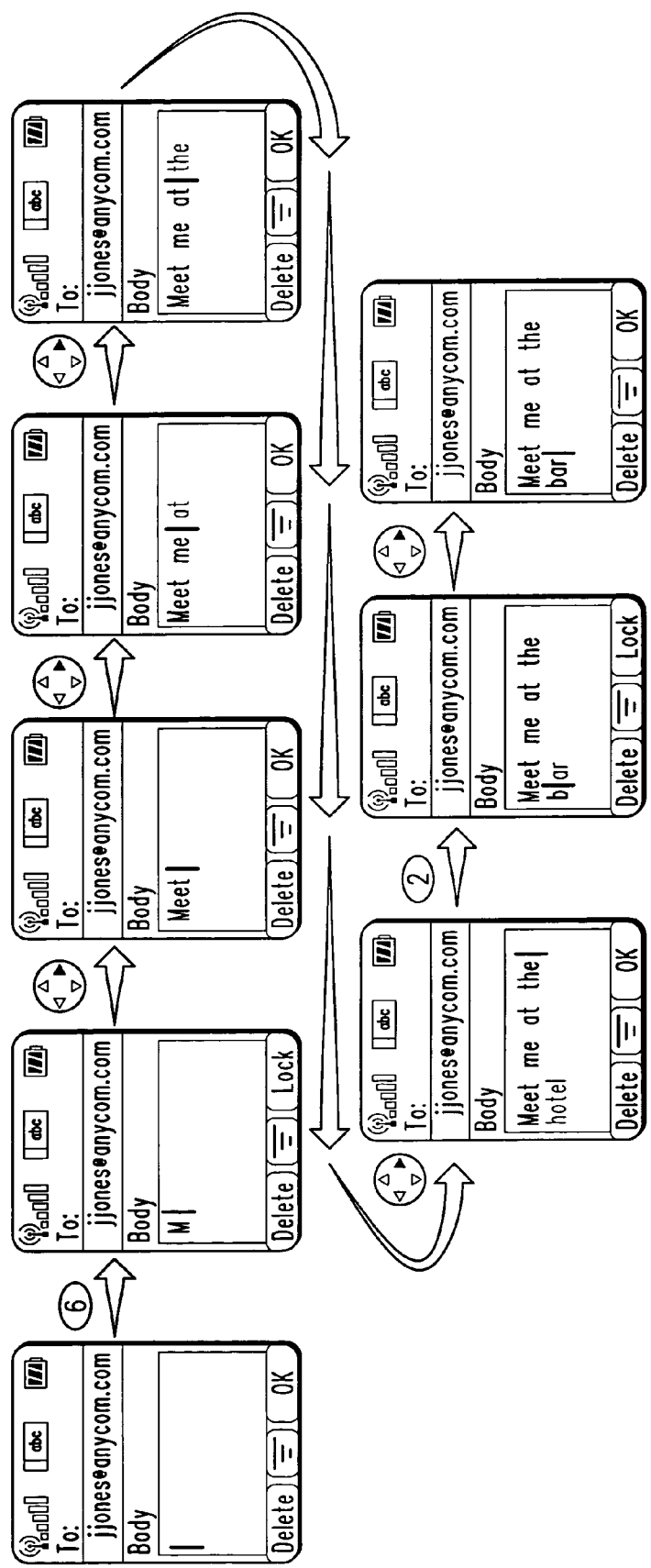
FIG. 23 is an examples of the various views that a user might see on a display of the electronic devices of FIGS. 1 and 3 in accordance with the operation of FIG. 22.

When the user does not accept the predicted next content element in Step 2215, the operation continues to Step 2225 in which the user interface determines whether the user can has continued to keep entering text and ignore the suggestion altogether. When the user is continuing to enter content in Step 2225, the operation cycles back to Step 2210 in which the next content element prediction is determined and displayed. For example, if the prediction offered is not the desired word or phrase, the user may simply keep typing. A press of any of the 1-9 keys will update the key press alternate, dismiss the first prediction, and offer a new prediction. A press of the space key will confirm the letters that have been entered via key press into the text area, followed by a space. FIG. 23 illustrates one example of the display and control operation described in the flowchart of FIG. 22.

The present invention, as described herein, provides a next generation predictive content input solution that takes the ease of content input on portable devices to another level. Using advanced word prediction and true context sensitive form filling, the present invention takes the user's phrases and language to create a personalized language model for fast content entry on the device. The present invention effectively increases typing speed through completions and next word predictions.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of operating an electronic device comprising the steps of:
    initiating entry of a content string by receiving a first key selection input, said first key corresponding to a first set of more than one textual characters;
    determining a most probable completion alternative using a personalized and learning database, said completion alternative being either (a) a most probable character selected from said first set of more than one textual characters or (b) a most probable sub-string, said sub-string beginning with said most probable character and including at least one additional character;
    displaying the most probable completion alternative in a content string entry line of a display of said electronic device;
    receiving a second input, said second input being either a second key corresponding to a second set of more than one textual characters or a selection key; and
    adding the most probable completion alternative to the content string entry line of said display for said second input being said selection key and said most probable completion alternative being the most probable sub-string, and adding a second completion alternative for said second input being said second key, said second completion alternative being a most probable second sub-string, said second sub-string beginning with said most probable first character and including said most probable second character and at least a most probable third character;
    wherein a user interface is provided that comprises a navigation key having a first set of controls, said first set of controls in an editing mode, for acceptance or non-acceptance of the most probable completion alternative currently displayed at the display and a second set of controls, said second set of controls in the editing mode, for changing or overriding the most probable completion alternative currently displayed at the display;
    wherein said first of controls are configured for scrolling a cursor right one character at a time or scrolling the cursor left one character at a time when said first set of controls are in a navigation mode;
    wherein said second set of controls are configured for scrolling the cursor down one line at a time or scrolling the cursor up one line at a time, when said second set of controls are in the navigation mode; and
    wherein:
        a right control of said first set of controls is configured for, in navigation mode and in a hold and press mode, jumping the cursor to the right one word at a time;
        a left control of said first set of controls is configured for, in navigation mode and in the hold and press mode, jumping the cursor left one word at a time;
        the left control being further configured for, in editing mode and in the hold and press mode, dismissing prediction and locking a last key press entry.

2. The method of operating an electronic device as defined in claim 1, further comprising the steps of:
    detecting a user input for going back in the content string after the adding step; and
    eliminating the most probable completion alternative from the content string.

3. The method of operating an electronic device as defined in claim 2, wherein the user input comprises a user pressing a left control of a navigation key.

4. The method of operating an electronic device as defined in claim 1 wherein the database comprises recently used data selected from a group consisting of one or more new words, one or more word associations, one or more context associations, one or more sensitivity associations, one or more Uniform Resource Locators, and one or more electronic mail addresses.

5. A method of operating an electronic device as defined in claim 1, further comprising the steps of: dismissing the most probable completion alternative when the user does not accept the most probable completion alternative; and displaying a next most probable completion alternative.

6. The method of operating an electronic device as defined in claim 1, further comprising the steps of: overriding the most probable completion alternative by a user input; and displaying a next most probable completion alternative.

7. The method of operating an electronic device as recited in claim 6, wherein the step of overriding comprises:
    the user pressing a first set of controls of a navigation key to indicate the overriding; and
    the user pressing a second set of controls of the navigation key to scroll through one or more completion alternates.

8. The method of claim 1 wherein said adding the most probable completion alternative to the content string entry line of said display further comprises
    Identifying as part of said most probable completion alternative, a most probable phrase consisting of at least a first word and a second word, said first word and said second word corresponding to a phrase stored in said personalized and learning database;
    displaying the most probable phrase in said content string entry line of said display;
    receiving a third input accepting said most probable phrase; and
    adding the most probable phrase to the content string entry line of said display in response to receiving said third input.

9. The method of operating an electronic device as defined in claim 8 wherein said phrase includes at least three words and has a maximum number of words and wherein the user accepts at least two words but less words than said maximum number of words.

10. The method of operating an electronic device as defined in claim 8 wherein the user accepts the entire most probable phrase.

11. The method of operating an electronic device as defined in claim 8, further comprising the step of:
    editing the most probable next phrase.

12. The method of operating an electronic device as defined in claim 11, wherein the editing step comprises pressing a control of a navigation key to move the focus to a next word of said phrase and comparing the next word to one or more word alternates, said word alternates being part of a phrase alternate.

13. The method of operating an electronic device as defined in claim 8, further comprising the steps of:
retrieving one or more alternate phrases from the personalized and learning database;
displaying the one or more alternate phrases; and
reviewing the one or more alternate phrases by a user using one or more controls of a navigation key.

14. A portable electronic device comprising:
a display for displaying a content string including one or more content elements;
a memory having a personalized and learning database stored within;
a user input for entering the one or more content elements of the content string; and
a user interface coupled to the display and to the memory and further coupled to the user input, wherein the user interface is adapted to:
initiate entry of a content string by receiving a first key selection input, said first key corresponding to a first set of more than one textual characters;
determine a most probable completion alternative using a personalized and learning database, said completion alternative being either (a) a most probable character selected from said first set of more than one textual characters or (b) a most probable sub-string, said sub-string beginning with said most probable character and including at least one additional character;
display the most probable completion alternative in a content string entry line of a display of said electronic device;
receive a second input, said second input being either a second key corresponding to a second set of more than one textual characters or a selection key; and
add the most probable completion alternative to the content string entry line of said display for said second input being said selection key and said most probable completion alternative being the most probable sub-string, and adding a second completion alternative for said second input being said second key, said second completion alternative being a most probable second sub-string, said second sub-string beginning with said most probable first character and including said most probable second character and at least a most probable third character;
wherein the user interface comprises a navigation key having a first set of controls, said first set of controls in an editing mode, for acceptance or non-acceptance of a most probable completion alternative currently displayed at a display and a second set of controls, said second set of controls in the editing mode, for changing or overriding the most probable completion alternative currently displayed at the display;
wherein said first of controls are configured for scrolling a cursor right one character at a time or scrolling the cursor left one character at a time when said first set of controls are in a navigation mode;
wherein said second set of controls are configured for scrolling the cursor down one line at a time or scrolling the cursor up one line at a time, when said second set of controls are in the navigation mode; and
wherein:
a right control of said first set of controls is configured for, in navigation mode and in a hold and press mode, jumping the cursor to the right one word at a time;
a left control of said first set of controls is configured for, in navigation mode and in the hold and press mode, jumping the cursor left one word at a time;
the left control being further configured for, in editing mode and in the hold and press mode, dismissing prediction and locking a last key press entry.

15. The portable communication device as defined in claim 14 wherein the user input comprises:
a navigation key having at least two control keys,
wherein a first control key provides for accepting of the most probable completion alternative.

16. The portable communication device as defined in claim 15 wherein a second control key provides for removing the added most probable completion alternative from the content string.

17. The portable communication device as defined in claim 16 wherein a third control key provides for requesting a next most probable completion alternative.

18. The portable communication device as defined in claim 16 wherein a third control key provides for overriding the most probable completion alternative, and further wherein a fourth control key provides for scrolling through one or more completion alternates.

* * * * *